United States Statutory Invention Registration [19]

[11] Reg. Number: H254

Hindman

[43] Published: Apr. 7, 1987

[54] METHOD OF INCREASING THE VOLUME YIELD OF EXFOLIATED VERMICULITE

[75] Inventor: James R. Hindman, Libby, Mont.

[73] Assignee: W. R. Grace & Co., Lexington, Mass.

[21] Appl. No.: 632,575

[22] Filed: Jul. 19, 1984

[51] Int. Cl.[4] ..... C04B 20/06

[52] U.S. Cl. ..... 252/378 R

[58] Field of Search ..... 252/378 R

[56] References Cited

U.S. PATENT DOCUMENTS

| | | | |
|---|---|---|---|
| 1,972,390 | 9/1934 | Miner et al. | 91/70 |
| 2,282,479 | 5/1942 | Johnston | 91/70 |
| 3,686,134 | 8/1972 | Robinson | 252/378 R |
| 4,034,120 | 7/1977 | Sidney et al. | 426/531 |
| 4,148,941 | 4/1979 | Pape et al. | 427/214 |

*Primary Examiner*—Mark L. Bell
*Assistant Examiner*—Susan Wolffe
*Attorney, Agent, or Firm*—John J. Wasatonic; William L. Baker

[57] ABSTRACT

A method is disclosed for increasing the volume yield of expanded vermiculite obtained by exfoliation of vermiculite ore particles. The method comprises the sequential steps of applying vegetable oil to the vermiculite ore particles and thermally exfoliating the vermiculite ore particles.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF INCREASING THE VOLUME YIELD OF EXFOLIATED VERMICULITE

The present invention relates to the exfoliation of vermiculite ore and more particularly to a method whereby the volume increase upon exfoliation of the vermiculite ore can be increased.

Vermiculite ore is well known for its capacity to undergo expansion to several times its original volume when subjected to elevated temperatures. The process of expanding vermiculite ore by heating is referred to as thermal exfoliation. This process is generally a continuous procedure in which vermiculite ore particles are fed into an expansion kiln or oven, heated rapidly to temperatures in the range of 1100° F. to 1900° F., and the resultant expanded vermiculite product removed from the heating zone as additional unexpanded material is introduced. The expanded vermiculite has a wide variety of well known uses, including use as an aggregate in plaster and concrete formulations, a thermal insulator, an extender in fertilizers and soil mixes, an inert carrier for chemicals, a packaging material, and as roughage or filler in animal feeds.

In reference to thermal exfoliation of vermiculite, it is common in the art to refer to the "yield" obtained by exfoliation, this being the volume of expanded vermiculite, when loosely accumulated without compression of the expanded particles, obtained from an initial weight of unexpanded ore. Since expanded vermiculite is generally sold on a volume basis, it proves economically advantageous to the producer to maximize the yield.

The present invention is directed toward a method for significantly increasing the yield of expanded vermiculite obtained by exfoliation of vermiculite ore. The method of this invention comprises the steps of applying a vegetable oil to unexpanded vermiculite ore particles and thermally exfoliating the ore to which the oil has been applied. It has been discovered that volume yield increases of up to about 9% can be attained with the present method. Volume yield increases in the range of about 4% to 7% are normally attained, although this range may vary as a function of the particular oil, water content of the vermiculite, and the origin of the vermiculite ore. As specified hereinafter, the yield increases are obtained with the application of relatively small quantities of vegetable oil, thus making the present method economically attractive.

In accordance with the present method, the vegetable oil should be uniformly applied to the vermiculite ore so as to provide an approximately equal amount of oil on each particle. This can be conveniently and accurately controlled by spraying the oil onto the ore particles and agitating or tumbling the particles as the oil is applied. Spraying a fine mist of the oil onto the particles as they are tumbled in a rotating mixer such as a cannister, drum or paddle blender is the preferred method. Spray application also facilitates modulation of the quantity of oil applied, so as to provide the desired uniform application using a minimal quantity of oil.

The oil is normally applied at ambient temperature, although it may be applied at elevated temperatures, e.g., by pre-heating the oil or by applying the oil to the vermiculite in a heated environment. Elevated temperatures may be advantageous, for example, for purposes of lowering the viscosity of the oil and thereby facilitating the spraying process or the distribution of the oil on the ore particles. The elevated temperature should, however, be substantially below that at which the vermiculite undergoes exfoliation, inasmuch as the oil or, more specifically, the oil temperature is not used to expand or promote expansion of the vermiculite.

The vegetable oil can be applied to the vermiculite in any amount which affords a volume yield increase. In the general, the oil is applied in a weight percentage amount of at least about 0.1%, based on the weight of vermiculite ore. Typically, the oil is applied in a weight percentage range of about 0.1%, based on the weight of vermiculite ore. This relatively small quantity of oil helps minimize any additional cost incurred by use of the present method and, thus, contributes significantly to the economic feasibility of employing the present method.

Vegetable oils constitute a well known and widely used class of materials. As used herein, the term "vegetable oil" includes all oils derived from vegetable seeds, fruits, and other vegetable matter. The vegetable oil can be refined or unrefined, unsaturated, or partially or completely hydrogenated. Examples of vegetable oils which can be used herein are soybean oil, castor oil, corn oil, sunflower oil, palm oil, cottonseed oil, peanut oil, and olive oil. Vegetable oils contain substantial levels of fatty acids and the present invention includes the use of fatty acids, per se, derived from or extracted out of vegetable oils. The term "vegetable oil", as used herein, thus also includes fatty acids, per se, derived from vegetable oil, examples of which are oleic acid, linoleic acid, lauric acid, ricinoleic acid, stearic acid, and palmitic acid.

The vermiculite ore to which the oil is applied should be dry to the touch and free flowing. Most preferably, the ore should be dried to remove essentially all of the unbound or surface water which is initially present on the ore sample. The ore should, however, retain its bound interlayer water, generally constituting 5% to 10% by weight of the ore, this water being generally recognized in the art as necessary for optimal thermal expansion of the ore.

The vegetable oil is believed to form a coating on at least the exterior major surfaces of the vermiculite ore particles. Although not wishing to be bound by any particular theory, it is speculated that this coating, due primarily to its hydrophobicity, inhibits the liberation of the interlayer water from the particles during exfoliation and thereby provides a greater degree of expansion of the individual particles and an overall increase in volume yield.

The ore particles used in the present process can be of any convenient dimension or size. As a general rule, vermiculite ore particles are obtained, either by milling or as naturally occurring materials, in particle sizes measuring from about 0.005 in. up to about 0.4 in. across their surface. These particles can be segregated according to size by screening, with arbitrary maximum and minimum sizes being set to define a given size range or grade of ore particles. After being separated into the various size grades, the ore particles are thermally exfoliated to yield an expanded product of substantially uniform particle size. In accordance with the practice in the art, the present method is also normally conducted employing ore particles which fall within a relatively narrow size range, as opposed to a mixture of particles which vary widely in size. As illustrated in the following Example, volume yield increases were obtained in the exfoliation of all of the various commercial grades of vermiculite ore which were expanded in accordance with the present method.

The oil treatment step of the present method provides an additional advantage in that it substantially reduces the dust which is often generated in the transport and handling of vermiculite ore, i.e., the oil which is applied to the ore is able to bind substantially the dust and fibrous particles present in the ore and thus suppress the liberation of same during the handling of the ore. It has been found that the application of as little as 0.1% of oil can provide substantial decreases in dust and fiber liberation and that the effectiveness of the oil in this respect increases with increasing dosage. From the standpoint of health and safety, this dust suppression aspect of the invention can be particularly advantageous and beneficial.

The oil treated vermiculite ore particles of this invention can be thermally exfoliated utilizing any of those procedures heretofore known in the art. Any suitable vermiculite expansion oven or furnace may be used. Thermal exfoliation procedures generally involve the continuous introduction of vermiculate ore particles into the upper end of a high temperature oven or furnace, at which point the ore is exposed to temperatures in the range of about 1100° F. to 1900° F. and undergoes rapid expansion. The expanded ore is allowed to fall to a lower zone within the oven under the action of gravity, at which point the particles may continue to expand due, at least in part, to residual heat acquired in the upper zone and retained in the particle. The particles are withdrawn from the lower end of the furnace at a rate approximately equal to the introduction of new particles into the furnace. Vermiculite exfoliation procedures and furnace apparatus for use in exfoliation are disclosed in U.S. Pat. Nos. 2,203,821; 3,010,911; and 3,533,610, and the disclosure of each of these patents is hereby incorporated by reference.

The present invention is further illustrated in the following Example which is intended as illustrative only and not in any limiting sense.

EXAMPLE

Five different size commercial grades of vermiculite ore were each divided into fifty pound batches and each batch was treated with a predetermined amount of partially hydrogenated refined soybean oil. Each oil application was conducted at ambient temperature by spraying a fine mist of the oil onto the ore particles as the particles were tumbled in a rotating drum mixer. The oil was dispensed at a rate of about 300 cc./min. over a period of 10 to 40 seconds, depending on the total amount of oil to be applied. After the spray application was completed, tumbling of the ore was continued for approximately 10 minutes.

The five different grades of vermiculite ore used in this Example, designated herein as Ore Grades A through E, were all commercial grade ores obtained from a mine in Libby, Mont. Previous analyses of samples of these commercial grades indicated the following bulk density and particle size distribution ranges:

| Sieve size (U.S. Series) | Weight Percent Retained Max. | Min. |
|---|---|---|
| | Ore Grade A: Bulk density: 45–60 lbs./ft.$^3$ | |
| 1 | 10 | 0 |
| 4 | 35 | 10 |
| 6 | 55 | 25 |
| 8 | 35 | 15 |
| 16 | 6 | 0 |
| 30 | 6 | 0 |
| | Ore Grade B: Bulk density: 55–65 lbs./ft.$^3$ | |
| 6 | 12 | 0 |
| 8 | 40 | 25 |
| 16 | 85 | 45 |
| 30 | 10 | 0 |
| | Ore Grade C: Bulk density: 55–65 lbs./ft.$^3$ | |
| 8 | 1 | 0 |
| 16 | 38 | 10 |
| 30 | 78 | 40 |
| 50 | 15 | 5 |
| 100 | 15 | 0 |
| >100 | 9 | 0 |
| | Ore Grade D: Bulk density: 55–65 lbs./ft.$^3$ | |
| 30 | 27 | 5 |
| 50 | 80 | 40 |
| 100 | 30 | 5 |
| >100 | 10 | 6 |
| | Ore Grade E: Bulk density: 60–70 lbs./ft.$^3$ | |
| 30 | 1 | 0 |
| 50 | 18 | 0 |
| 100 | 70 | 35 |
| >100 | 70 | 24 |

Two hundred and fifty grams of each oil treated sample were expanded in an electrically heated laboratory assay furnace at a temperature of approximately 1800° F. The furnace comprised a four foot long column equipped with internal baffles. The vermiculite ore was introduced at the top of the column and allowed to fall under gravity through the baffle system, this requiring approximately 10–15 seconds.

The expanded ore was collected at the bottom of the column, allowed to cool, and poured into a 5 liter graduated cylinder to determine the final volume. This volume was extrapolated to a "bag yield" corresponding to the number of 4 cubic foot bags which would be obtained from one ton of the oil-heated ore sample. For comparison purposes, a "Control" sample of 250 grams of each ore grade, which was not treated with the oil, was expanded in an identical manner and the resultant volume or extrapolated bag yield used as a basis for determining yield increases due to oil application. Table 1 provides the results for all test and control samples. In Table 1, the "Oil Dosage" is the amount of oil in ounces applied to each 50 pound ore sample.

TABLE 1

| Ore Grade | Oil Dosage (oz.) | Yield (Bags/Ton) | % Yield Increase |
|---|---|---|---|
| A | Control | 95.5 | — |
| A | 0.8 | 95.5 | 0 |
| A | 1.6 | 98.2 | 2.8 |
| A | 2.4 | 98.2 | 2.8 |
| A | 3.2 | 100.9 | 5.6 |
| B | Control | 84.5 | — |
| B | 0.8 | 87.3 | 3.3 |
| B | 1.6 | 87.3 | 3.3 |
| B | 2.4 | 87.3 | 3.3 |
| B | 3.2 | 88.7 | 4.9 |
| C | Control | 75.8 | — |
| C | 0.8 | 83.7 | 10.4 |
| C | 1.6 | 82.3 | 8.5 |
| C | 2.4 | 82.3 | 8.5 |

TABLE 1-continued

| Ore Grade | Oil Dosage (oz.) | Yield (Bags/Ton) | % Yield Increase |
|---|---|---|---|
| C | 3.2 | 82.3 | 8.5 |
| D | Control | 60.5 | — |
| D | 0.8 | 63.3 | 4.6 |
| D | 1.6 | 63.3 | 4.6 |
| D | 2.4 | 63.3 | 4.6 |
| E | Control | 44.9 | — |
| E | 3.2 | 47.6 | 6 |
| E | 4.0 | 47.6 | 6 |
| E | 4.8 | 47.6 | 6 |

Each of the above oil-treated samples was observed to generate substantially less dust during handling than did the control samples.

It should be appreciated that the results provided in Table 1 are illustrative and that the volume yield increases may vary depending on, for example, the oil applied to the ore, ore content and origin, and expansion temperatures and procedures. In addition, since certain changes, modifications, and substitutions can be made in the above-described method without departing from the scope of the invention, it is intended that all matter contained in the above description shall be interpreted as illustrative and not limitative.

What is claimed is:

1. A method for increasing the volume yield of expanded vermiculite ore particles comprising the sequential steps of applying about 0.1% to about 1% by weight of a vegetable oil to said particles, based on the weight of said particles, at a temperature below that at which said ore particles undergo exfoliation and thermally exfoliating said ore particles in an expansion oven or expansion furnace.

2. A method of claim 1 wherein said vegetable oil is selected from the group consisting of soybean oil, castor oil, corn oil, sunflower oil, palm oil, cottonseed oil, peanut oil, olive oil, and fatty acids derived therefrom.

3. A method of claim 2 wherein said vegetable oil is soybean oil.

4. A method of claim 1 wherein said vegetable oil is sprayed onto said particles as said particles are tumbled in a rotating mixer.

5. A method of claim 1 wherein said particles are thermally exfoliated at a temperature in the range of about 1100° F. to 1900° F.

* * * * *